Sept. 24, 1940. W. L. McGRATH ET AL 2,215,970
BACKPEDALING HUB BRAKE
Filed April 25, 1939
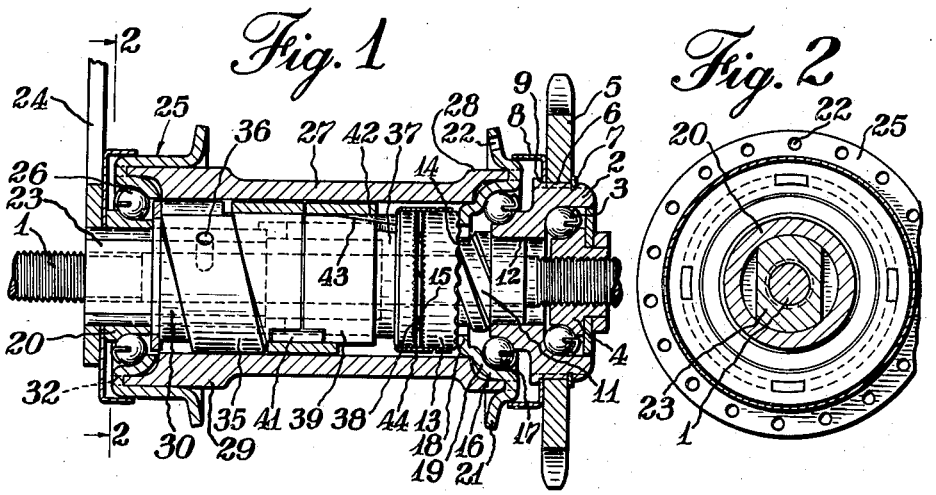
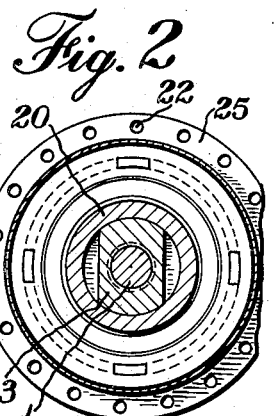
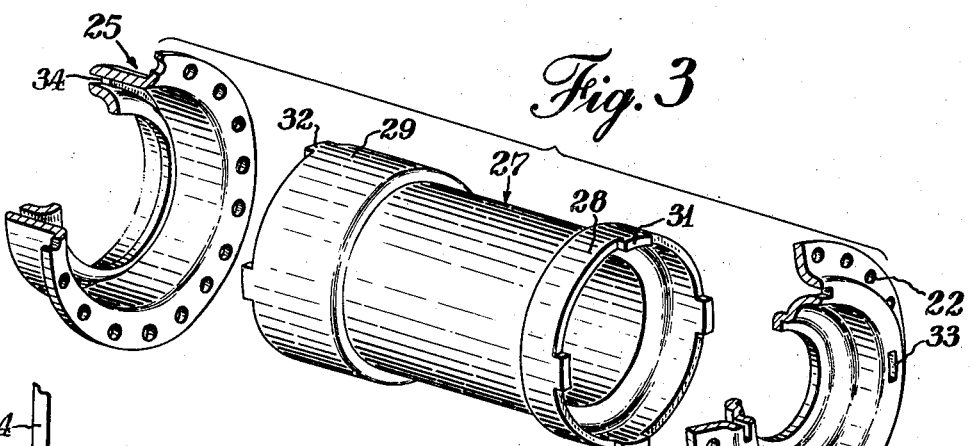
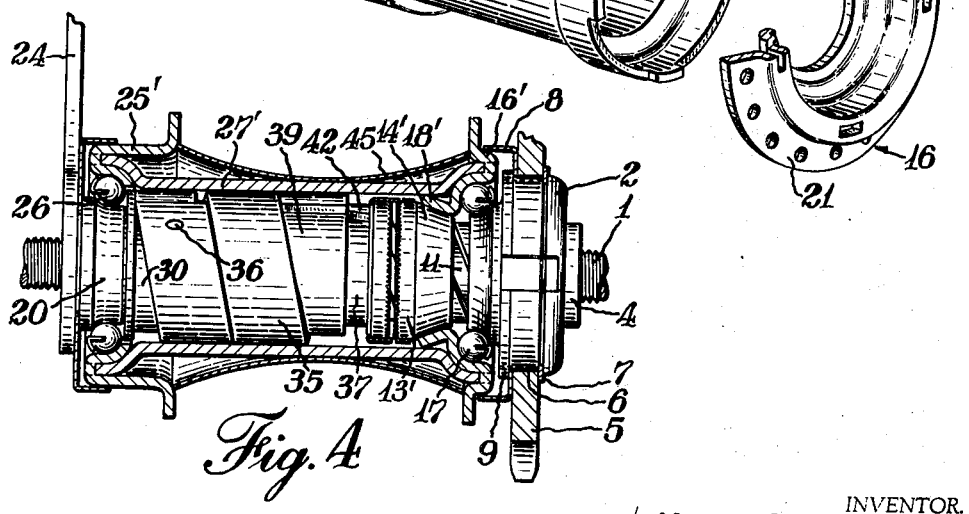
INVENTOR.
William L. McGrath
BY E. Elliott Hood
Clinton S. Janes
ATTORNEY.

Patented Sept. 24, 1940

2,215,970

UNITED STATES PATENT OFFICE 2,215,970

BACKPEDALING HUB BRAKE

William L. McGrath and E. Elliott Hood, Elmira, N. Y., assignors to Bendix Aviation Corporation, South Bend, Ind., a corporation of Delaware Application April 25, 1939, Serial No. 269,970

7 Claims. (Cl. 192—6)

The present invention relates to a backpedaling hub brake for velocipedes and the like and more particularly to a coil type coaster brake for bicycles.

It is an object of the present invention to provide a novel brake mechanism which is efficient and reliable in operation while being simple and economical in construction.

It is a further object to provide such a device which is designed to employ stampings of interlocking conformation to adapt the structure for inexpensive manufacture and easy assembly.

It is another object to provide such a device in which the spoke flanges and bearing cups for the hub are formed integrally and have an interlocking connection with the hub barrel.

It is another object to provide such a device in which the hub barrel may be formed of tubing suitably enlarged and formed at its ends to conform to and key into the spoke flange and bearing members.

Further objects and advantages will be apparent from the following description taken in connection with the accompanying drawing in which:

Fig. 1 is a side view partly in section and partly in elevation of a preferred embodiment of the invention;

Fig. 2 is a section taken substantially on the line 2—2 of Fig. 1;

Fig. 3 is an expanded view in perspective of the hub barrel and spoke flange members in disassembled relation; and Fig. 4 is a view similar to Fig. 1 of a second embodiment of the invention.

In Fig. 1 of the drawing there is illustrated a fixed axle 1 threaded at both ends for the reception of clamping nuts by which the axle is fixedly mounted in the frame of a vehicle such as a bicycle, not illustrated. A driving member 2 is journalled on one end of the axle 1 as by means of anti-friction bearings 3 and a bearing cone 4 threaded on the end of the axle. A sprocket 5 is rigidly mounted on the driving member 2 as by means of interlocking tongues and grooves as indicated at 6, and is retained by a split lock ring 7 against a dust cap 8 which is seated against a shoulder 9 on the periphery of the driving member.

A screw shaft 11 is fixed to the driving member 2 as by welding or brazing as indicated at 12 and has mounted thereon an actuating member in the form of a nut 13 having clutch teeth 14 and 15 formed on the ends thereof. A combined driven clutch member, bearing cup and spoke flange member 16 is journalled on the driving member by means of anti-friction bearings 17. This member is generally annular in form with a toothed or rippled internal flange 18 forming a driven clutch member adapted to be engaged by the teeth 14 on the nut 13, an intermediate portion 19 forming a race for the bearings 17, and a peripheral flange 21 having openings 22 for the reception of wheel spokes.

An anchor sleeve 23 is mounted on the axle 1 and prevented from rotation by suitable means such as a torque arm 24 arranged to be attached to the frame of the vehicle. A spoke flange and bearing cup member 25 is journalled on the anchor sleeve 23 by means of bearings 26 and cone 20. A hub barrel 27 is provided at its ends with annular flanges 28 and 29 arranged to fit around the bearing cup portions of the spoke flange members 16 and 25, and has axially extending lugs 31 and 32 fitting in openings 33 and 34 respectively in the spoke flange members so as to lock the hub barrel and spoke flange members for rotation in unison.

A spiral brake member 35 is anchored as by means of a pin 36 to an anchor block 30 non-rotatably mounted on the anchor sleeve 23. An expander member 37 is freely mounted on the end of the anchor sleeve 23 within the free end of brake member 35 and is provided with teeth 38 on its end adapted to engage with the teeth 15 of nut 13 when the nut is traversed to the left in Fig. 1 by backward rotation of screw shaft 11.

A split thimble 39 is mounted on the anchor sleeve 23 within the free end of the spiral brake 35, being prevented from rotation by keying means 41. A wedge 42 engages in a flared opening 43 in said thimble and is actuated by backward motion of the expander member 37 to expand the thimble 39 and thereby cause the free end of the brake 35 to be pressed into engagement with the interior of the hub barrel 27.

In the operation of this embodiment of the invention, rotation of the driving member 2 in a forward direction by the sprocket 5 causes the clutch nut 13 to be moved by the screw shaft 11 to the right into engagement with the clutch flange 18 of the composite member 16. Thereafter, the driving member, clutch nut and hub barrel 27 are locked for forward rotation in unison. When rotation of the driving member 2 is stopped, the clutch nut 13 backs away from its driving position, thus allowing the hub to overrun or coast. Upon backward rotation of the driving member 2, the clutch nut 13 is traversed to the left, such traversal being assisted, if desired, by a friction detent member such as illustrated at 44. Clutch teeth 15 are thus caused to engage teeth 38 of the expander member 37, after which further longitudinal motion of the clutch nut 13 causes the expander member 37 to force the wedge 42 into the split thimble 39, expanding the same and causing expansion of the free end of the spiral brake member 35. Braking force is thus exerted on the hub 27, which force tends to increase the application of the brake inasmuch as the brake is wound in such a direction as to make it self-energizing. The braking reaction is transmitted from the anchored end of the brake through the anchor block 30 and sleeve 23 to the torque arm 24.

It will be seen that there is here provided a simple and economical form of hub brake structure which particularly by reason of the employment of the composite spoke flange and bearing members may be readily assembled, disassembled and serviced, and in which the bearing members are readily replaceable.

In the structure illustrated in Fig. 4, the elements of the driving and braking mechanism are in general the same as previously described and are similarly numbered. In this embodiment of the invention, however, the hub shell 27' is formed of tubing which is flared at its ends to receive the composite spoke flange and bearing members 16' and 25', and a flared cylindrical member 45 is mounted on the hub barrel between the spoke flanges in order to smooth up the exterior of the hub.

The composite member 16' is in this embodiment of the invention provided with a conical clutch flange 18' which is arranged to cooperate with a conical clutch surface 14' on the clutch nut 13'.

The remaining elements of this embodiment of the invention and the operation thereof are substantially the same as the first embodiment, and further description thereof is deemed unnecessary.

It will be readily seen that this structure is easily adapted for manufacture by economical processes and that the hub brake so provided is correspondingly economical and efficient.

Although but two embodiments of the invention have been shown and described in detail, it will be understood that other embodiments are possible and various changes may be made in the design and arrangements of the parts without departing from the spirit of the invention as defined in the claims appended hereto.

What is claimed is:

1. In a backpedaling hub brake for velocipedes, a cylindrical hub barrel, and bearing cup members fitting within the ends of the barrel, said members being formed with radial spoke flanges surrounding the ends of the barrel and with intermediate portions keyed on the ends of the barrel for rotation in unison therewith.

2. In a backpedaling hub brake for velocipedes, an axle, a driving member and an anchor member mounted thereon with provision for relative longitudinal adjustment, a wheel hub barrel on the axle between the driving and anchor members, bearing cup members seated in the ends of the barrel having radially extending webs enveloping the ends of the barrel and forming spoke flanges for the wheel, said webs having openings and the ends of the hub having lugs seated in said openings to key the spoke flange members to the hub, and bearings on the anchor and driving members maintaining the bearing cups in their seats and rotatably supporting the hub barrel.

3. In a hub brake for velocipedes, an axle, an anchor member and a driving member mounted thereon, a wheel hub barrel on the axle, bearing cup members seated in the ends of the barrel, bearings on the anchor member and driving member holding the cups in their seats and rotatably supporting the hub barrel, brake means for the hub including a control member, one of said cup members being formed with a clutch flange, and an actuating member mounted on the driving member having clutch surfaces engageable selectively with the control member and the clutch flange.

4. In a hub brake for velocipedes, an axle, an anchor member and a driving member mounted thereon, a wheel hub barrel on the axle, bearing cup members seated in the ends of the barrel having radial webs forming spoke flanges surrounding the barrel, said webs having an interlocking engagement with the ends of the hub, bearings on the anchor member and driving member holding the cups in their seats and rotatably supporting the hub barrel, brake means for the hub including a control member, one of said cup members being formed with a clutch flange, and an actuating member mounted on the driving member having clutch surfaces engageable selectively with the control member and the clutch flange.

5. In a coaster brake, a tubular hub barrel having enlarged cup-shaped ends forming seats, and bearing cups in said seats having webs enclosing the ends of the barrel and having radial spoke flanges surrounding and reenforcing the ends of the barrel both internally and externally.

6. In a coaster brake, a tubular hub barrel having enlarged ends forming seats with axial lugs extending therefrom, and bearing cups in said seats having webs enclosing the ends of the barrel, said webs having openings receiving the lugs to key the bearing cups to the barrel and having radial spoke flanges surrounding the barrel.

7. In a coaster brake, a tubular hub barrel having enlarged ends forming seats, bearing cups in said seats having webs enclosing the ends of the barrel and having radial spoke flanges surrounding the barrel, one of said bearing cups having an inwardly extending flange formed as a clutch member, a driving member journalled in said bearing cup, and an actuating member threaded on the driving member formed with a clutch face adapted to engage and drive the clutch member.

WILLIAM L. McGRATH.
E. ELLIOTT HOOD.